United States Patent [19]

Furuta et al.

[11] 4,451,418

[45] May 29, 1984

[54] METHOD FOR FORMING A GREEN BODY OF CERAMIC ARC TUBES USED FOR A METAL VAPOR DISCHARGE LAMP AND A MOLDING DIE FOR FORMING SAID TUBE

[75] Inventors: Mamoru Furuta, Toyoake; Yoshio Maeno; Kazuo Kobayashi, both of Nagoya, all of Japan

[73] Assignee: NGK Insulators, Ltd., Japan

[21] Appl. No.: 403,401

[22] Filed: Jul. 30, 1982

[30] Foreign Application Priority Data

Aug. 4, 1981 [JP] Japan .................................. 56-121316

[51] Int. Cl.³ ............................................. C04B 35/64
[52] U.S. Cl. ........................................ 264/63; 264/1.2; 264/209.1; 264/523; 264/540
[58] Field of Search .................. 264/63, 1.2, 523, 540, 264/209.1

[56] References Cited

U.S. PATENT DOCUMENTS

| | | | |
|---|---|---|---|
| 3,354,246 | 11/1967 | Brauscum | 264/540 |
| 3,363,034 | 1/1968 | Noland et al. | 264/540 |
| 3,382,532 | 5/1968 | Schweiger | 264/540 |
| 3,428,722 | 2/1969 | Chittenden et al. | 264/540 |
| 4,159,295 | 6/1979 | Mazzuchelli et al. | 264/63 |
| 4,264,558 | 4/1981 | Jacobsen | 264/523 |
| 4,387,067 | 6/1983 | Kobayashi et al. | 264/63 |

Primary Examiner—Donald E. Czaja
Assistant Examiner—W. Thompson

Attorney, Agent, or Firm—Parkhurst & Oliff

[57] ABSTRACT

A ceramic green arc tube for a metal vapor discharge lamp wherein an outer diameter of the arc discharging portion is larger than that of the end portions holding the discharging electrodes is produced by preparing a stiff plastic body consisting mainly of a ceramic material or which main component is alumina, and a binder of which main component is thermal geltinizing organic substance; forming the prepared body into a straight tubular body by means of an extruder; placing the tubular body into an inner cavity of molding die having the above described ceramic arc tube shape wherein the molding die has been previously heated; closing one end portion of the tubular body; applying a compressed fluid from another opened end portion of the tubular body into the inside of said tubular body to inflate the central portion of tubular body until contacting to the inner cavity surface of the molding die,; hardening and drying the inflated body with the heat of previously heated molding die; and ejecting the dried body from the die. This production is characterized in that the forming is effected by using a die comprising two halves of die divided by a plane parallel to an axial direction of the tube, said two halves forming an inner circumferential cavity conforming to the shape of the tube when the two halves are engaged, vents provided at the cavity portion and perforating from the inner surface of the cavity to the outside, and heating means.

5 Claims, 12 Drawing Figures

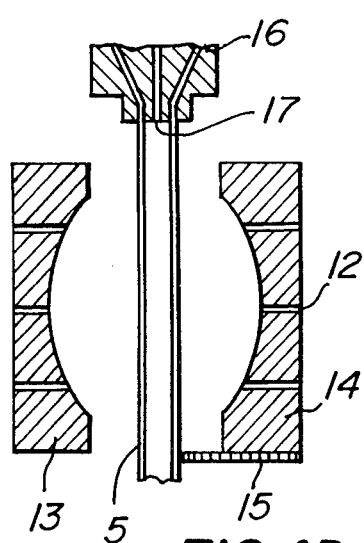
FIG._4A
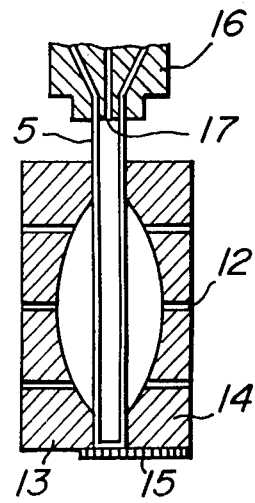
FIG._4B
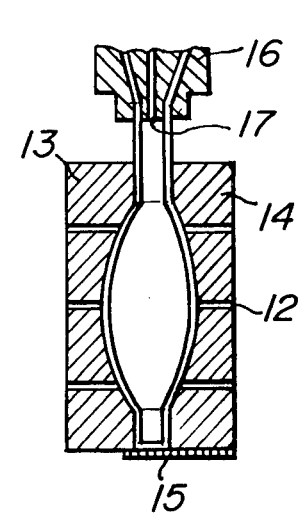
FIG._4C
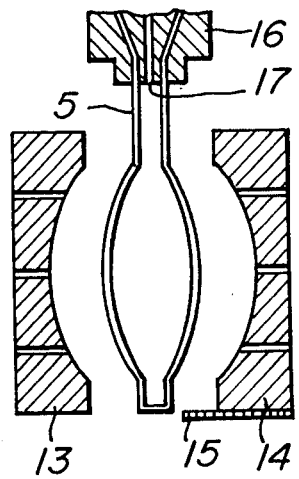
FIG._4D
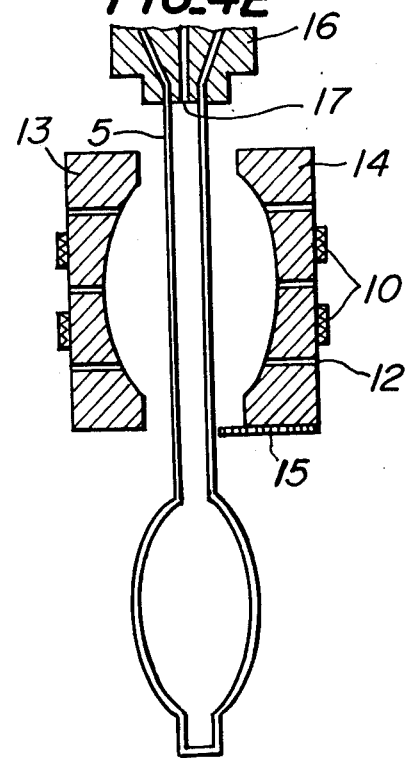
FIG._4E

METHOD FOR FORMING A GREEN BODY OF CERAMIC ARC TUBES USED FOR A METAL VAPOR DISCHARGE LAMP AND A MOLDING DIE FOR FORMING SAID TUBE

BACKGROUND OF THE INVENTION

1. Field of the Invention

The present invention relates to a method for forming a green body of ceramic arc tube used for a metal vapor discharge lamp, such as a high pressure sodium lamp, metal halide lamp and the like and a molding die for forming said green body.

2. Description of the Prior Art

As shown in FIG. 1, ceramic arc tubes of these metal vapor discharge lamps may be those produced by sealing a tubular translucent alumina ceramic 1 opened at both ends with heat resisting metal or ceramic caps 2 by means of a glass frit 4 and additionally co-sealing discharge electrodes 3 to central holes of the caps 2 with a glass frit 4. But, such arc tubes are complicated in the production method and have troubles in the dulable life and stability of metal vapor discharge lamp from the view of gas tightness and corrosion resistance of high pressure metal vapor for sealing portion with the glass frit, and further in the improvement of luminous efficiency and color rendition based on the difficulty of maintaining a coldest spot of metal valor due to the straight tubular shape.

Therefore, a ceramic integrally shaped arc tube in which an outer diameter of the arc discharge portion is larger than that of the end portions holding discharge electrodes has been proposed. According to this proposal, such an arc tube is made of forming a green body with the core shaped from metal or wax having a low melting point by means of a isostatic pressing method and then heating the body to melt out the core, and firing the body. But, in this case, the green body is easily cracked owing to thermal expansion of the core and the core material is stuck on the inner surface of body when the core is heated and melted out, so that the light transmittance of obtained arc tube is reduced and the wall thickness of the tube is not uniform.

SUMMARY OF THE INVENTION

An object of the present invention is to provide a method for forming a ceramic integrally shaped arc tube, wherein an outer diameter of the central portion is larger than that of the tube end portions.

Another object of the present invention is to provide a molding die for forming the above described green body of the ceramic arc tube.

The present invention lies in a method for forming a green body of a ceramic green arc tube for a metal vapor discharge lamp wherein an outer diameter of the arc discharging portion is larger than that of the end portions holding the discharging electrodes which comprises preparing a stiff plastic body consisting mainly of a ceramic material or which main component is alumina, and a binder of which main component is thermal geltinizing organic substance; forming the prepared body into a straight tubular body by means of an extruder; placing the tubular body into an inner cavity of molding die having the above described ceramic arc tube shape wherein the molding die has been previously heated; closing one end portion of the tubular body; applying a compressed fluid from another opened end portion of the tubular body into the inside of said tubular body to inflate the central portion of tubular body until contacting to the inner cavity surface of the molding die; hardening and drying the inflated body with the heat of previously heated molding die; and ejecting the dried body from the die.

Furthermore, the present invention lies in a novel molding die suitable for the above described forming method.

BRIEF DESCRIPTION OF THE INVENTION

FIG. 4 is diagrammatical views for illustrating the forming steps wherein a molding die according to the present invention made of two halves is used;

DESCRIPTION OF THE PREFERRED EMBODIMENT

Active alumina fine powders having a high purity which become a translucent alumina ceramics through the final firing, a sintering assistant, a binder consisting mainly of a water soluble thermal gelatinizing organic substance which is decomposed or volatilized by preliminary firing and a mixing assistant (for example water) are thoroughly wet mixed and then dried and kneaded so as to have a plasticity sufficient to effect the below described forming to prepare a stiff plastic body.

Alumina fine powders and a sintering assistant are selected from known $\alpha$-alumina, $\gamma$-alumina, magnesium compounds, rare earth compounds depending upon the required transmittance, firing conditions, mechanical properties and the like.

As the binder, water soluble thermal gelatinizing organic substances, such as methyl cellulose are preferable, because the solubility is important in view of the affinity with alumina fine powders and the convenience in handling and the thermal gelatinizing ability is important in view of the hardenability of the formed body by using a heated molding die mentioned hereinafter. Selection of the kind of the organic substance and the amount may be determined by the shape of the product, the deformation degree in the forming step and the like.

It is merely necessary that the mixing aid is highly wetted with the mixture or becomes a solvent and is removed in the after steps of drying and firing and in general, water is used but it may be a water-insoluble agent depending upon the shape of the formed body. Use of a vacuum kneader for obtaining the plasticity is desirable because no air is contained in the stiff plastic body.

Then, the stiff plastic body is subjected to an extruder or a press machine to obtain a tubular shaped body. An inner diameter of the tube is preferably equal to or slightly larger than a diameter of electrodes of the discharge lamps in the size of the finally fired tube.

Figure 1:
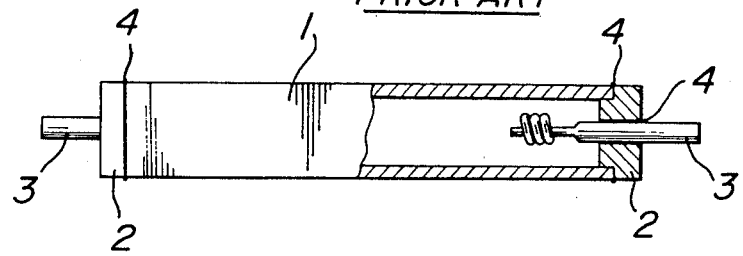
FIG. 1 is a front view of an arc tube of the prior art, with a part thereof cutaway.
Figure 2A:
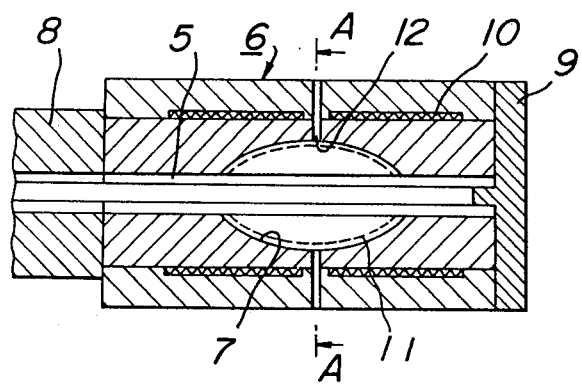
FIG. 2A is a schematic sectional view for illustrating the method according to the present invention and a molding die used therefor and FIG. 2B is a sectional view of the die taken along a line A—A in FIG. 2A in the arrow direction.

Then, as shown in FIGS. 2A, B, the above tubular body 5 is placed in a fusiform cavity 7 formed in the inside of a molding die 6 heated at a given temperature by an electric heater 10 embedded in the die or provided at the outside of the die and an end portion 8 of a compressing machine (not shown) by which a compressed fluid is supplied into the inner portion of the tubular shaped body 5 from one end thereof, is connected to the molding die 6 and an end member 9 for closing another opening end portion of the tubular shaped body is fitted to the molding die 6, then the compressing machine is driven to inflate the tubular shaped body so that the diameter of said body at the central portion is larger than that of the tube end portions, and concurrently the inflated tube is hardened and dried by heat generated by the heater 10 to obtain a formed body 11 shown by a broken line and then the application of the fluid is stopped and the formed body 11 is removed from the die 6.

Figure 3:
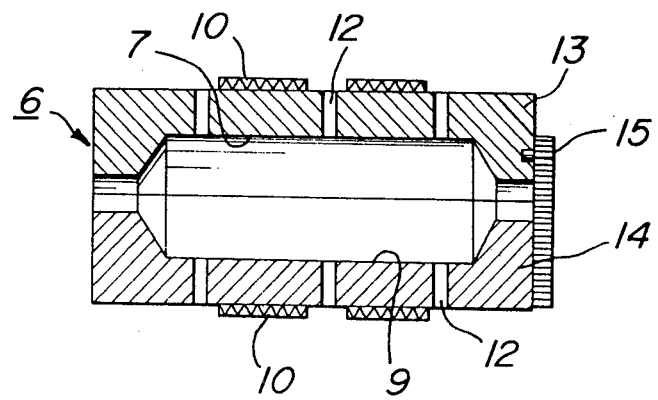
FIG. 3 is a schematic sectional view of one embodiment of molding die according to the present invention.

The molding die is preferably to provide with vents 12 perforating from the cavity 7 of the die 6 to the outside as shown in FIG. 3. These vents 12 serve to exhaust air present between the tubular shaped body and the inner surface of the die when supplying the compressed fluid into the tubular shaped body and to promote the forming.

The size of the air vents is made small enough not to form convex portions on the outer surface of the formed body when the tubular body is inflated by the compressed fluid to the inner circumferential surface of the molding die and the size and number are determined so that air can be exhausted corresponding to the inflating rate.

The molding die 6 is constructed with two halves 13 and 14 divided with a plane parallel to the axial direction of a green tubular body as shown in FIG. 3 or FIG. 4, whereby the formed body can be taken out from the molding die 6 and a continuous forming of the fusiform arc tube is feasible as explained hereinafter.

Figure 2B:
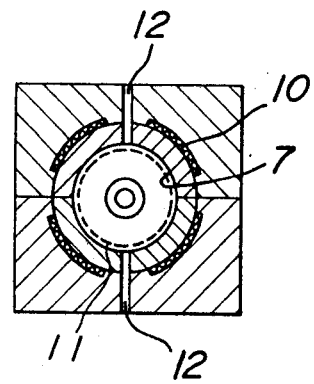

The closing of the opened end portion of the tubular shaped body in the forming step may be effected by plugging said portion with the end member 9 shown in FIG. 2 or by press-sealing and concurrently cutting said portion by means of a cutting device 15 provided at one end of either of the molding die halves 13 and 14.

A further detailed explanation will be made with respect to the cutting device 15 hereinafter with reference to FIGS. 4, A-E.

The molding half die 13 and another molding half die 14 provided with the cutting device 15 are arranged apart and the straight tubular body 5 is extruded through an extrusion die 16 to a given length between the separated two molding halves (FIG. 4A).

Then, the molding halves 13, 14 are engaged so as to put the tubular body 5 between the halves, whereby one end of the body is press-sealed and cut with the above described cutting device 15 (FIG. 4B).

Then, a compressed fluid is supplied into the inside of the tubular body 5 from an opening 7 for supplying the compressed fluid which is provided in the extrusion die 16, to inflate the ceramic tube into a fusiform shape (FIG. 4C).

In this case, the formed body is heated by heaters provided in the molding die to harden and dry the formed body and then the molding die halves 13 and 14 are separated (FIG. 4D).

Then, the tubular body 5 is extruded to a given length to eject the formed fusiform body from the position of the molding die halves 13, 14 (FIG. 4E).

The above described process is successively repeated, whereby the green tubes having the fusiform shape can be continuously obtained.

It is apparent from the above explanation that the fusiform tubes can be easily formed by dividing the molding die into two halves.

Furthermore, the two halves of the molding die may be connected by a hinge.

Figure 5:
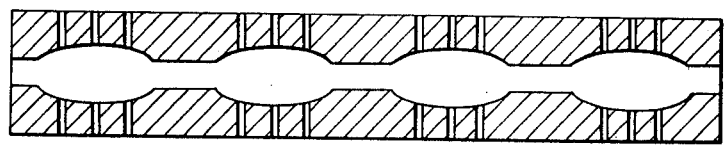
FIG. 5 is a schematic sectional view of another embodiment of molding die according to the present invention.

The molding die is not limited to one cavity as shown in FIG. 2, but may be also provided with a plurality of successive cavities having the above described fusiform shape as shown in FIG. 5. In this case, the shaped body may be but off into individual article after forming or firing. The internal shape of the die is merely required to be ones which suit to satisfy the lamp properties.

As the heat generating source provided in the die 6, electric heaters, for example, a cartridge heater, a surface heater and the like may be embedded in the die or provided on the outer circumferential surface in view of the easiness of temperature control and the setting but the present invention is not limited to the electric heaters and for example, passage holes for flowing a heat exchanging fluid are provided in the die 6 and a heating fluid, such as hot water is supplied into the passage holes as a heat generating source.

The capacity of the heat generating source is influenced by size, and shape of the formed body 11 and also the characteristics of stiff plastic body and raw material but is proper to select so that the temperature of the inner surface of the die is maintained at 80°-160° C., preferably 130°-150° C.

As the compressed fluid, air is generally convenient, but a fluid which does not attack the tube body, or an oil of attacking to the body is prevented by protecting the body with a rubbery elastomer, may be used. The fluid may be a heated fluid as the heating source for hardening and drying the formed body 11. The compressed fluid is supplied for a time in which the tubular body 5 is inflated and hardened and dried but said time is influenced by the kind of the stiff plastic body and the temperature of the die and particularly, it is important that said time is determined depending upon a size of the tube thickness and is preferred to be 3-10 seconds in view of the operation efficiency.

It is advantageous for continuous forming that the opening portion for supplying the compressed fluid is provided in the extrusion die for forming the tubular body as explained with reference to FIG. 4.

Then, the formed body (green fusiform tube) is preliminarily fired in air in order to remove the binder. The preliminary firing condition is determined by the kind of the binder and the size of the product but the temperature is preferred to be one which does not deteriorate the activity of the formed body, that is lower than 1,200° C. The preliminarily fired shaped body is finally fired at a high temperature. The final firing conditions, that is temperature, time and atmosphere are determined by the composition of the stiff plastic body, the size of the product, the required transmittance, the mechanical strength of the product and the like.

Figure 6:
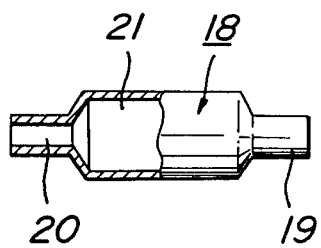
FIGS. 6 and 7 are partially cutaway front views of ceramic arc tubes obtained according to the present invention respectively.
Figure 7:
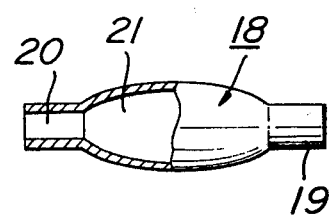

Embodiments of ceramic arc tubes 18 for metal vapor discharge lamps obtained in the above described method are shown in FIG. 6 and FIG. 7. In this method, the diameter of both tube end portions 19, 20 can be easily finished in a size suitable for insertion of electrodes of the metal vapor discharge lamp and the tube end portions 19, 20 and the central portion of an arc tube, that is the arc discharging portion 21 are fusiformally formed without providing any bonding portion, so that it is possible to make the gas proof sealing portion smallest and since the method of the present invention does not cause any contamination in the inner surface of the arc tube, the transmittance is higher. The form of the arc tubes is not limited to that shown in FIG. 6 and FIG. 7 and can be properly modified according to the above described forming conditions.

The present invention will be explained in more detail.

The following example is given for the purpose of illustration of the invention and is not intended as limitation thereof.

EXAMPLE

Alumina fine powders having purity of 99.99% and grain size of $0.1-0.2\mu$ were mixed with 0.05% by weight of magnesium oxide, 0.05% by weight of yttrium oxide, 3% by weight of an organic binder of methyl cellulose, 1% by weight of a lubricant of polyethylene glycol and 25% by weight of water and the mixture was thoroughly kneaded by using a kneader and then subjected to a vacuum kneader to prepare a stiff plastic body. This body was extruded through a piston type extruder into a tubular body having an outer diameter of 6.5 mm$\phi$ and an inner diameter of 2.5 mm$\phi$ and immediately placed in a molding die which has a fusiform inner circumferential surface and is heated at 150° C. by a heater embedded in the die, and one end of the tubular body was sealed, after which compressed air was fed from another end of the ceramic tubular body to inflate the tubular body into a shape conforming to the inner shape of the die to obtain a fusiformal forming body. The formed body was left to stand in the die for about 3 seconds to harden and dry the tube surface, after which the formed body was taken out from the die and heated under air in a heating furnace at 800° C. for 3 hours to completely remove the organic substances and then fired in a vacuum furnace at 1,800° C. for 6 hours. The thus obtained alumina ceramic tube had a high dimension precision particularly in the outer diameter size and a uniform wall thickness and a smooth surface roughness. The obtained tube showed an air proof of $10^{-10}$ atom cc/sec in a leak detector and satisfactorily endured to the quenching test in water from 200° C. and when said arc tube was measured by means of an integrating sphere type photometer, the total light transmittance was 93%.

As mentioned above, in the method for forming the ceramic tube for metal vapor discharge lamp according to the present invention, the tubular body is inflated by a compressed fluid into the shape of the molding die having a given dimension, which has been previously heated and thermally expanded, so that the obtained arc tube is high in the dimension precision. Since the moldability of the stiff plastic body is improved by heating of the die, the surface is smooth and the forming speed is high. In the case of a tube having a thin wall thickness, the hardening and drying can be effected in a short time, so that there is no fear of deformation. In addition, the formed body can be hardened and concurrently dried, so that no particular drying step is needed. The shrinkage of the body due to the hardening and drying can be restrained by the compressed fluid, so that the precision of the size of the inner shape is excellent. Furthermore, the discharge arc portion and the electrode-holding portions are integrated, so that the gas proof is high, and this is an excellent commercial production method from a view of applying continuous forming way.

What is claimed is:

1. A method for forming a green body of a ceramic green arc tube for a metal vapor discharge lamp wherein an outer diameter of an arc discharging portion is larger than that of end portions of the arc tube which hold discharging electrodes, comprising: preparing a stiff plastic body consisting essentially of a ceramic material, having alumina as a major component, and a binder having a thermal gelatinizing organic substance as a major component; forming the prepared body into a straight tubular body by an extrusion means; placing the tubular body into an inner cavity of a modding die having an inner portion corresponding to a desired outer shape of the ceramic arc tube, wherein the molding die has been previously heated; closing one end portion of the tubular body; applying a compressed fluid from another opened end portion of the tubular body into the inside of the tubular body to inflate the central portion of tubular body until the green body contacts the inner portion of the molding die; hardening and drying the inflated green body with the heat of the previously heated molding die; and ejecting the dried body from the die.

2. The method of claim 1, wherein the compressed fluid is supplied from an opening portion in the extrusion die.

3. The method of claim 1, wherein the molding die is divided into two halves by a plane parallel to an axial direction of a green body to be formed and the extruded tubular ceramic material is positioned between the two halves of the molding die, thereby placing the extruded tubular ceramic material in a cavity formed by the two halves of the molding die.

4. The method of claim 3, wherein the sealing of one end opening of the tubular shaped body is effected by means of a cutting device provided at one end of one of the halves of the die, the sealing occurring when the two die halves are engaged.

5. The method of claim 2, wherein the molding die is divided into two halves by a plane parallel to an axial direction of a green body to be formed and the extruded tubular ceramic material is positioned between the two halves of the molding die, thereby placing the extruded tubular ceramic material in a cavity formed by the two halves of the molding die.

* * * * *